Jan. 8, 1935.  C. FLORI  1,987,436

WASHING, DYEING, RINSING, AND DRYING MACHINE

Filed June 20, 1931   2 Sheets-Sheet 1

INVENTOR
Charles FLORI

Jan. 8, 1935.                    C. FLORI                    1,987,436

WASHING, DYEING, RINSING, AND DRYING MACHINE

Filed June 20, 1931          2 Sheets-Sheet 2

INVENTOR:
Charles FLORI.
By Chatwin & Company Attys.

Patented Jan. 8, 1935

1,987,436

UNITED STATES PATENT OFFICE

1,987,436

WASHING, DYEING, RINSING, AND DRYING MACHINE

Charles Flori, Marseille, France

Application June 20, 1931, Serial No. 545,702
In Great Britain April 1, 1931

1 Claim. (Cl. 68—18)

The present invention refers to a washing, dyeing, rinsing and drying machine combined in such a manner as to effect the several operations without the necessity of withdrawing from the basket the tissues, linens, hemps, threads or any materials requiring these operations.

Figure 1:
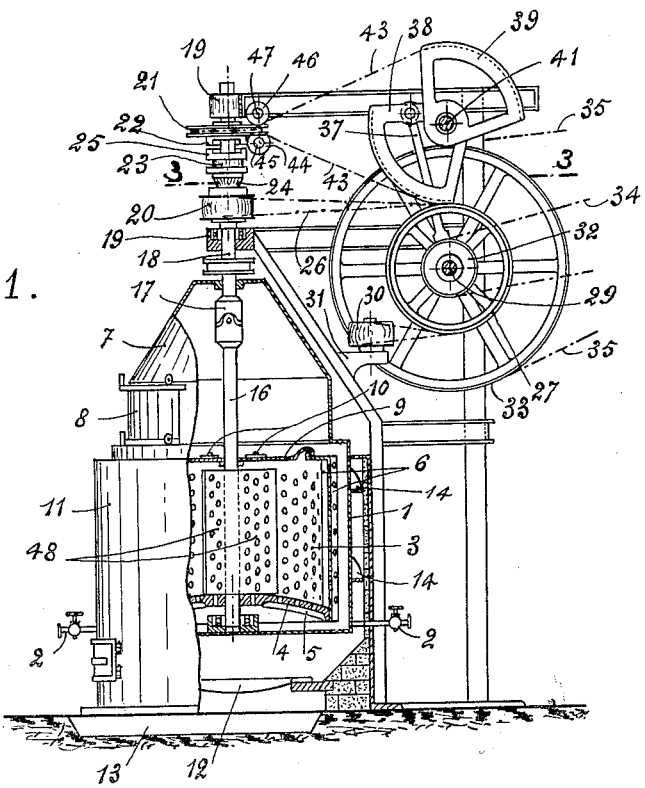
Figure 2:
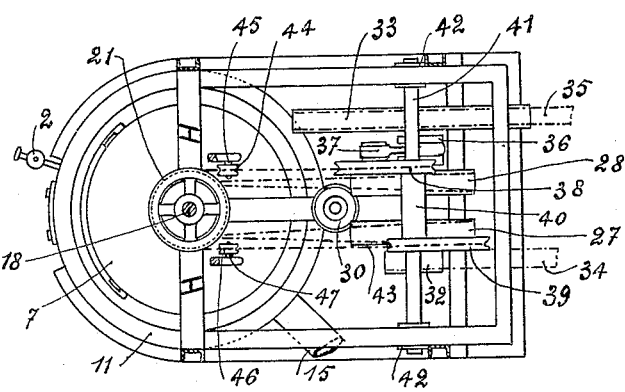
Figure 3:
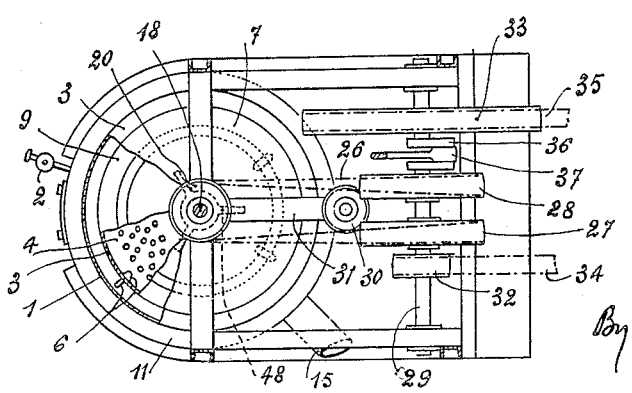
Figure 4:
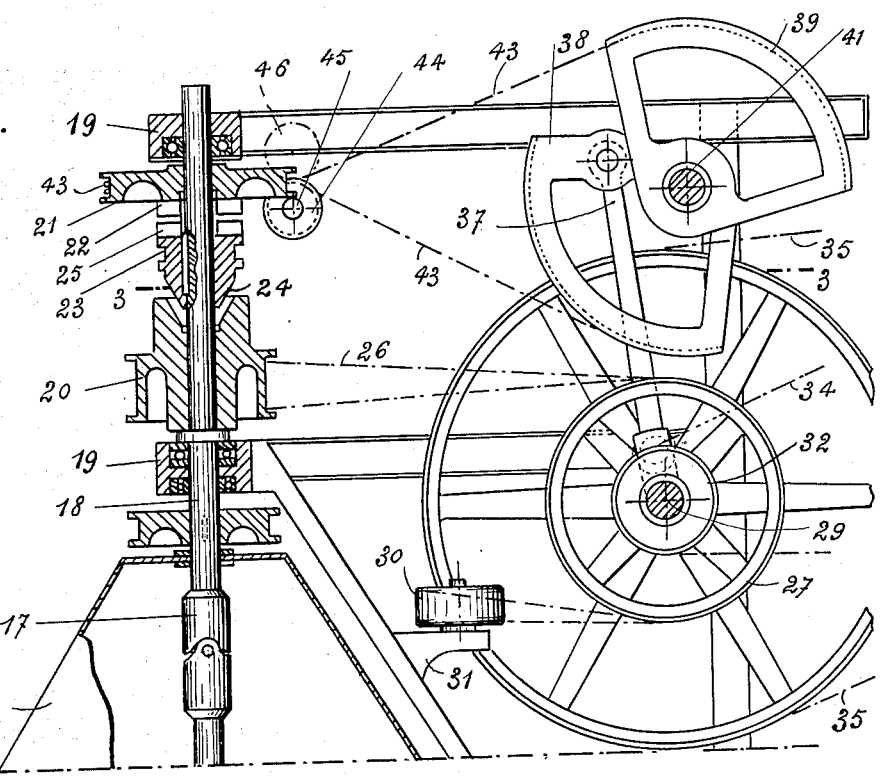
Figure 5:
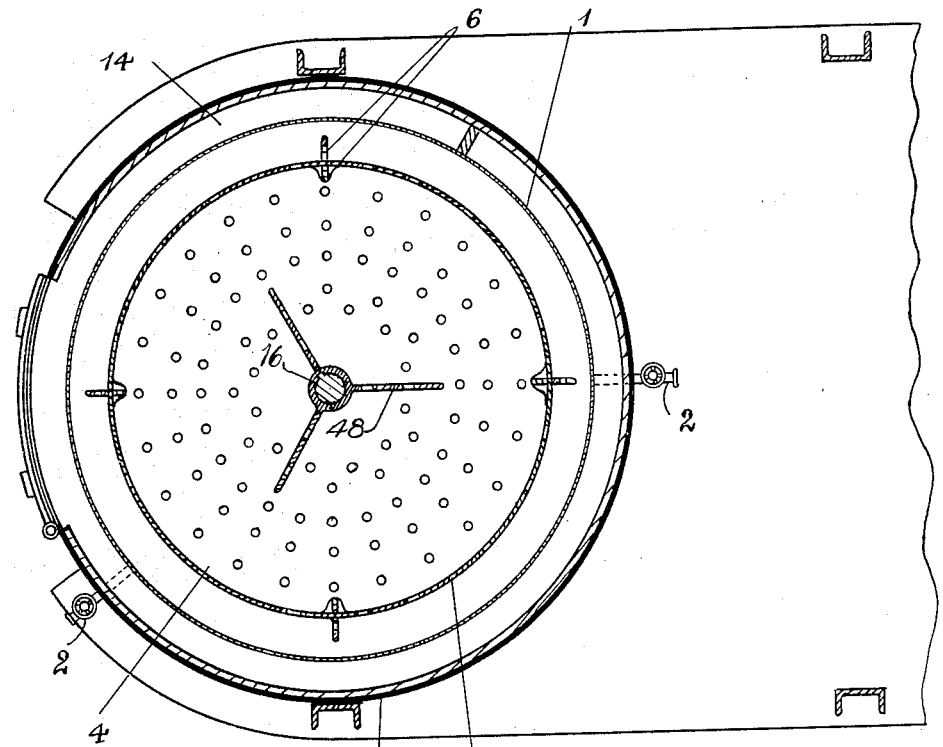

To give a practical realization of the invention without however limiting the invention to the arrangements of accessories, these details being independent of the invention proper, the accompanying drawings show, by way of example:

Figure 1 is a part sectional elevation to show the details; Fig. 2 is a plan view, the upper bearing being removed so that the various parts may be better seen; Fig. 3 is a sectional plan view according to the line 3—3 of Figure 1. Figure 4 represents the upper part of Figure 1 drawn to an enlarged scale and Figure 5 is a horizontal cross section of the device through the tank and container.

In its details the machine comprises: 1 a bowl of sheet metal, copper or casting carrying the cocks 2 adapted to admit or evacuate the liquids necessary for the various treatments to which the materials are to be subjected.

In the bowl 1 rotates a drum or basket 3 which is cylindrical and perforated with holes over its entire periphery as well as on the bottom 4 which moreover comprises below the baffles 5 adapted to assist the penetration of fluids in the holes of the bottom. Likewise on the periphery inside and outside of the basket are disposed other baffles 6 intended as the previous ones, to cause the circulation of fluid contained in the bowl 1, in the basket while ensuring by the internal ones a rubbing of the treated materials which favours the penetration of liquid and uniform treatment.

The bowl 1 is surmounted with a casing 7 which is watertight and capable of withstanding a pressure of about 1 to 5 kilograms, on which is arranged a door 8 giving access to the inside.

The basket 3 is formed, on top by a two-part cover 9 articulated by hinges 10.

Around the bowl 1 is an envelope 11 which serves as a furnace, underneath by means of the arrangement of a set of firebars 12 and an ashpit 13. The flames from the heating circuit are caused to pass through channels by screens arranged in spirals 14 disposed between the bowl 1 and the casing 11, the fumes being evacuated through a conduit 15 placed at the side and directed to any appropriate flue of the locality wherein the apparatus is disposed. The firebars 12 can be replaced by any suitable heating means, the exact means of supplying heat being quite outside the scope of the present invention, but only as regards the possibilities of the place where the machine is placed.

The rotation of the basket 3 is obtained by a shaft 16 set vertically suspended by a cardan type of joint 17 itself connected to another shaft 18 turning in bearings 19 preferably ball bearings or the like.

On the shaft 18 are freely mounted: a pulley 20 having an internal conical gear and a second pulley 21 on the hub of which is provided a toothed gear 22. Between the two pulleys 20, 21 is a sleeve 23 keyed on the shaft 18 but not fast in order to be able to slide upwardly or downwardly; the sleeve 23 is terminated; on the side of the pulley 20 by a friction cone 24 forming co-acting part to that of the pulley 20, and on the side of the pulley 21, by teeth 25 which co-act with the teeth 22.

The pulley 20 receives a rotary movement through a belt 26 passing over two pulleys 27 and 28 one of which 27 for instance is keyed on a horizontal shaft 29 while the other 28 is mounted loose on this shaft. The belt 26 returns over a pulley 30 mounted loose on a shaft fixed on a support 31 or frame.

On the shaft 29 are keyed two other pulleys, the one 32 of small diameter and the other 33 of large diameter permitting of giving to this shaft two speeds, a high speed and a reduced speed through the intermediary of belts 34 and 35 coming directly from the transmission and from the motor.

The shaft 29 carries in addition a crank shaft 36 (Fig. 3) on which is articulated a rod 37 (Figs. 1 and 2) and through the same imparts to a sector 38 an oscillatory movement said sector being coupled to a second sector 39 through the intermediary of a sleeve 40 (Fig. 2) mounted on a horizontal shaft 41 (Figs. 1 and 2) which turns in bearings 42 secured to the frame. From the sector 38 starts a cable 43 which passes over a pulley 44, loose on a shaft 45, winds one or more turns on the pulley 21, passes under a second pulley 46, loose on a shaft 47 and is secured to a second sector 39.

To improve the various operations, there is arranged on the shaft 16 in the interior of the basket 3, baffles 48 generally three in number, pierced also with holes to facilitate the circulation of fluid.

The function or operation of the mechanical parts consists in:

(1) a rapid rotation of the basket by means of the belt 34 which drives pulley 32 keyed on the shaft 29 which gives a rapid rotation to pulley 20 through the intermediary of pulley 27 and belt 26; by the engagement of the cone 24 this rotation is transmitted to the shaft 18 and consequently to the basket.

(2) a slow rotation of the basket by engaging pulley 33 with the belt 35.

(3) an alternative movement of the basket by engagement of pulley 33 with the belt 35, and through the intermediary of the crank shaft 36, of the connecting rod 37 of the sectors 38, 39, of the cable 43 and of the pulley 21; the displacement towards the top of sleeve 23 causes the teeth 22 and 25 to engage which transmits the alternative movement to the basket 3.

I claim:

A washing, dyeing and drying machine, comprising a bowl adapted to contain fluid, a casing connected to and closing the top of said bowl, a door in said casing giving access to the bowl, an envelope surrounding said bowl, means for heating said bowl, said means being mounted in said envelope, a vertical shaft in said bowl, means for rotating said shaft with a continuous motion, said shaft having an alternate motion in addition to said continuous motion, a perforated basket mounted on said shaft, said basket being located in the fluid in said bowl, and being adapted to hold the articles to be treated, a door in the top of said perforated basket for insertion of the articles to be treated, baffles mounted in said perforated basket, adapted to rub the articles to be treated, and baffles mounted on the exterior of said perforated basket, adapted to force the fluid in the bowl to pass through the perforated walls of the basket.

CHARLES FLORI.